United States Patent
Makmel et al.

(10) Patent No.: US 10,440,028 B1
(45) Date of Patent: Oct. 8, 2019

(54) DISTRIBUTED AUTHORIZATION OF IDENTITIES IN A DYNAMIC CONNECTED ENVIRONMENT

(71) Applicant: CyberArk Software Ltd., Petach-Tikva (IL)

(72) Inventors: Gil Makmel, Petach-Tikva (IL); Or Gamliel, Petach-Tikva (IL); Dima Barboi, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/249,647

(22) Filed: Jan. 16, 2019

Related U.S. Application Data

(63) Continuation-in-part of application No. 16/188,660, filed on Nov. 13, 2018, which is a continuation of
(Continued)

(51) Int. Cl.
*H04L 29/06* (2006.01)
*H04L 29/08* (2006.01)
(Continued)

(52) U.S. Cl.
CPC ............ *H04L 63/102* (2013.01); *G06F 21/40* (2013.01); *H04L 9/0637* (2013.01); *H04L 63/08* (2013.01); *H04L 63/0861* (2013.01); *H04L 63/0876* (2013.01); *H04L 67/10* (2013.01); *H04L 63/205* (2013.01)

(58) Field of Classification Search
None
See application file for complete search history.

(56) References Cited

U.S. PATENT DOCUMENTS 9,866,545 B2 * 1/2018 Beecham ............... H04L 63/08
2013/0055367 A1 2/2013 Kshirsagar et al.
(Continued)

FOREIGN PATENT DOCUMENTS

WO WO 2013/113025 A2 8/2013
WO WO 2017/173099 A1 10/2017

OTHER PUBLICATIONS

Extended European Search Report issued by the European Patent Office dated Oct. 22, 2018 in corresponding Application No. 18167526.5.
(Continued)

*Primary Examiner* — Shin-Hon (Eric) Chen
(74) *Attorney, Agent, or Firm* — Finnegan, Henderson, Farabow, Garrett & Dunner LLP

(57) ABSTRACT

Techniques include receiving, at a sensor, a request for authentication of an identity; determining, based on a distributed ledger, a dynamic credibility score for the identity; determining whether the dynamic credibility score for the identity can be validated by consensus by at least a subset of distributed verification services, based on whether the dynamic credibility score for the identity is within a range of variance from one or more credibility scores for the identity determined by the subset of the plurality of distributed verification services; and determining, based on whether the dynamic credibility score for the identity can be validated by consensus, whether to authorize the identity to perform the action in the blockchain network.

20 Claims, 9 Drawing Sheets

Related U.S. Application Data application No. 15/925,006, filed on Mar. 19, 2018, now Pat. No. 10,135,835.

(51) Int. Cl.
*G06F 21/40* (2013.01)
*H04L 9/06* (2006.01)

(56) References Cited

U.S. PATENT DOCUMENTS

| | | | |
|---|---|---|---|
| 2015/0244690 A1* | 8/2015 | Mossbarger | H04L 63/061 713/171 |
| 2017/0111175 A1* | 4/2017 | Oberhauser | H04L 9/3247 |
| 2017/0289134 A1* | 10/2017 | Bradley | H04L 63/102 |
| 2018/0075527 A1* | 3/2018 | Nagla | G06F 21/6218 |
| 2018/0176017 A1* | 6/2018 | Rodriguez | H04L 63/08 |
| 2018/0232817 A1* | 8/2018 | Isaacson | G06Q 30/0613 |
| 2018/0253464 A1* | 9/2018 | Kohli | H04L 9/3236 |

OTHER PUBLICATIONS

John Morrison, *Context integrity measurement architecture: A privacy-preserving strategy for the era of ubiquitous computing*, 2016 7<sup>th</sup> Annual UEMCON, IEEE (Oct. 20, 2016).

\* cited by examiner

DISTRIBUTED AUTHORIZATION OF IDENTITIES IN A DYNAMIC CONNECTED ENVIRONMENT

CROSS REFERENCE TO RELATED APPLICATIONS

This application is a continuation-in-part of U.S. application Ser. No. 16/188,660, filed Nov. 13, 2018, currently pending, which is a continuation of U.S. application Ser. No. 15/925,006, filed Mar. 19, 2018, (now U.S. Pat. No. 10,135,835), both of which are incorporated herein by reference.

BACKGROUND

Many enterprises and service providers strive to improve security and usability of services they provide over their networks. Access control techniques such as single sign-on and the like are popular because they may satisfy both security and usability requirements established by enterprises and service providers. For example, access control techniques such as single sign-on and the like may permit a user to use one set of login credentials (e.g., name and password) to access multiple related yet independent systems. Further, many enterprises and service providers store user names and passwords in a single, centralized repository, which is vulnerable to credential harvesting attacks. Similarly, many users centrally store credentials on their own machine, or in an application (e.g., as embedded credentials), both of which are likewise vulnerable to attack and theft.

However, individual systems often have different credential requirements and require users to update their passwords at different intervals, resulting in users having to keep track of a large number of different logon credentials for different systems. There is thus a need for technological solutions for creating passwordless and distributed authentication to allow a system to verify an identity without a password or other authentication credential associated with the identity. There is further a need for technological solutions allowing such distributed authentication where individual enterprises lack a sufficient number of ledgers and thus need to coordinate with other enterprises to perform distributed authentication. In addition, there is a need for technological solutions addressing what information to store in, and what information to omit from, ledgers used in distributed authentication.

Further, there is a need for technological solutions for allowing for authorization or authentication in large networks of sensors (e.g., IoT sensors). Such authorization or authentication should be policy-based and should account for operational permissions, connection permissions, access permissions, access controls, and other parameters. Further, such authorization or authentication techniques should be granular, and operate on a request-specific basis for individual identities. Rather than utilize simply a deterministic rules-based decision for such requests by identities, authorization or authentication should take into account credibility scores or probabilities based on all available data regarding the identity and the request.

SUMMARY

The disclosed embodiments describe non-transitory computer readable media and methods for dynamically authorizing an action made by an identity in a dynamically connected networked environment. For example, in an exemplary embodiment, there may be a non-transitory computer readable medium including instructions that, when executed by at least one processor, cause the at least one processor to perform operations for dynamically authorizing an action made by an identity in a dynamically connected networked environment. The operations may comprise: receiving, at a first sensor associated with a first verification service, from among a plurality of distributed verification services in a distributed network, a request for authorizing the action made by the identity, wherein the request includes no authentication information associated with the identity and the request is associated with a request to perform the action in the distributed network; determining, based on a distributed ledger belonging to the distributed network, and maintained by a verification service and shared by the plurality of distributed verification services, a dynamic credibility score for the identity, the dynamic credibility score for the identity being based in part on a level of trust of the first sensor; wherein the distributed ledger is developed based on receiving information associated with a plurality of different types of credibility-building actions taken by a user associated with the identity at a plurality of sensors associated with the plurality of distributed verification services, each of the plurality of sensors being configured with permissions data; determining whether the dynamic credibility score for the identity can be validated by consensus by at least a subset of the plurality of distributed verification services, based on whether the dynamic credibility score for the identity is within a range of variance from one or more credibility scores for the identity determined by the subset of the plurality of distributed verification services; and determining, based on whether the dynamic credibility score for the identity can be validated by consensus, whether to authorize the identity to perform the action in the distributed network.

According to a disclosed embodiment, the request includes no authentication credentials associated with the identity.

According to a disclosed embodiment, each of the plurality of distributed verification services is associated with one or more of the plurality of sensors.

According to a disclosed embodiment, the level of trust is based, at least in part, on the requested action.

According to a disclosed embodiment, the level of trust is based, at least in part, on an access-restricted resource associated with the verification service.

According to a disclosed embodiment, the first sensor comprises at least one of: a biometric sensor or an RFID transceiver.

According to a disclosed embodiment, the request for authorization is made by the identity.

According to a disclosed embodiment, each of the plurality of sensors is assigned a weight, wherein the weight determines an amount that one or more of the plurality of distributed verification services brings to the consensus.

According to a disclosed embodiment, the first verification service is verified to the distributed network that includes the plurality of distributed verification services.

According to a disclosed embodiment, authorizing the identity to perform the action in the distributed network comprises allowing the identity to access an access-restricted resource.

According to another disclosed embodiment, a method may be implemented for dynamically authorizing an action made by an identity in a dynamically connected networked environment. The method may comprise: receiving, at a first sensor associated with a first verification service, from among a plurality of distributed verification services in a distributed network, a request for authorization of the action made by the identity, wherein the request includes no authentication information associated with the identity and the request is associated with a request to perform the action in the distributed network; determining, based on a distributed ledger belonging to the distributed network, and maintained by the first verification service and shared by the plurality of distributed verification services, a dynamic credibility score for the identity being based in part on a level of trust of the first sensor; wherein the distributed ledger is developed based on receiving information associated with a plurality of different types of credibility-building actions taken by a user associated with the identity at a plurality of sensors associated with the plurality of distributed verification services, each of the plurality of sensors being configured with permissions data; determining whether the dynamic credibility score for the identity can be validated by consensus by at least a subset of the plurality of distributed verification services, based on whether the dynamic credibility score for the identity is within a range of variance from one or more credibility scores for the identity determined by the subset of the plurality of distributed verification services; and determining, based on whether the dynamic credibility score for the identity can be validated by consensus, whether to authorize the identity to perform the action in the distributed network.

According to a disclosed embodiment, determining the dynamic credibility score for the identity includes dynamically calculating the dynamic credibility score based on the level of trust associated with the first sensor.

According to a disclosed embodiment, determining whether the dynamic credibility score for the identity can be validated by consensus is based on the level of trust associated with the first sensor.

According to a disclosed embodiment, the first verification service is verified to the distributed network that includes the plurality of distributed verification services.

According to a disclosed embodiment, the identity has a contract with the distributed network that includes the dynamic credibility score for the identity.

According to a disclosed embodiment, the first sensor comprises an RFID transceiver at a physical access point to a building.

According to a disclosed embodiment, the first sensor comprises a biometric sensor of a computing device.

According to a disclosed embodiment, the first sensor comprises an input interface of an IoT device.

According to a disclosed embodiment, the credibility-building actions are received by a plurality of sensors, each credibility-building action being assigned a weight based on the level of trust associated with each of the plurality of sensors.

According to a disclosed embodiment, authorizing the identity to perform the action in the distributed network comprises allowing the identity to access an access-restricted resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Described herein are "no password" or "passwordless" authentication techniques that operate in a distributed manner. Embodiments of the authentication techniques may enable secure authentication in various types of distributed frameworks, such as blockchain implementations, without the need for a user to manually provide authentication credentials (e.g., username, password, biometric information, tokens, certificates, keys, etc.). The authentication techniques may allow users to log into a system, or authenticate to a different system, without having to remember or enter authentication credentials. Further, the authentication techniques may allow a user to access a secured resource based on data from one or many sensors (e.g., IoT sensors) in a physical environment.

The various implementations described herein overcome many drawbacks of current authentication systems. The described passwordless authentication system may harden existing systems and defend against malicious activities. Further, a distributed system framework (e.g., blockchain-based) removes the need for a single repository of credentials and thereby minimizes the risk of credential harvesting from a single source (e.g., Directory, LDAP, etc.). Further, by utilizing data from many sensors, authorization decisions can be highly refined and the resulting probabilities or confidence scores can be more reliable.

Reference will now be made in detail to the disclosed embodiments, examples of which are illustrated in the accompanying drawings.

Figure 1:
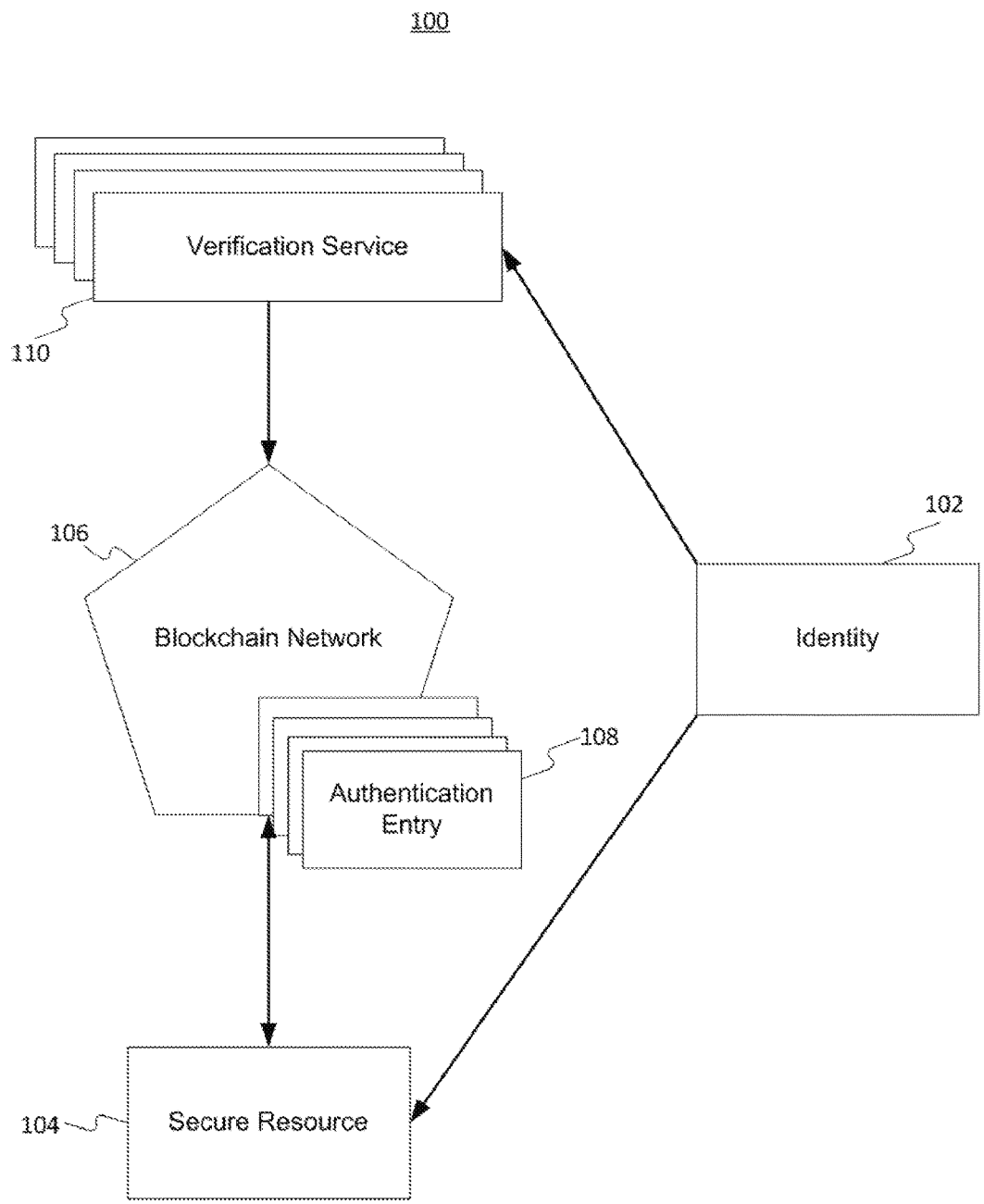
FIG. 1 is a block diagram of an example system in accordance with disclosed embodiments.

FIG. 1 is a block diagram of an example system 100 in accordance with disclosed embodiments. As shown, system 100 includes an identity 102 and a secure resource 104, which may be accessible to identity 102 in an access-restricted manner. System 100 also includes a blockchain network 106 configured to store user credibility authentication entries 108 (e.g., as a shared ledger), and a verification service 110. In some embodiments, user credibility authentication entries 108 may be user credibility contracts. Identity 102 may be associated with an identity that is verified by a verification service, as described further below, thereby authenticating identity 102.

Identity 102 may be any account, person, or entity attempting to access a resource, such as a database, server, storage device, another identity, etc. In other embodiments, identity 102 may be an automated and/or computerized entity. For example, a computerized entity may be a scheduled backup service, task, etc. performed by one or more processors or systems. System 100 may require these automated and/or computerized entities to be authenticated to the system prior to performing a task. In some embodiments identity 102 may be authorized to access the resource 104. In other embodiments, identity 102 may not be authorized to access the resource 104. Identity 102 may be, for example, a local account on a computer or computer system that is established according to a particular operating system (e.g., Microsoft Windows®, Mac OS®, UNIX, etc.), a particular security service, or another service or protocol governing the computer or computer system. Identity 102 may also be a network account, such as an account established according to a network operating system (e.g., a Microsoft® network operating system, a Cisco® network operating system, a Dell® network operating system, a Linux network operating system, etc.). Further, network account identities may be established based on network security protocols or services. In addition, identity 102 may be an instance of a virtual machine or container running in a cloud computing environment. Identity 102 may also be a token used to identify a particular computing resource, person, account, virtual machine, container, or other entity accessing a computer or network.

Secure resource 104 may be any secure device, application, database, and/or network that requires an identity (e.g., identity 102) to be authenticated before accessing the resource. Secure resource 104 may be, for example, a database, a server, an IoT device, a personal computing device, a smartphone, a vehicle infotainment system, computer-embedded clothing, a building, an automated teller machine (ATM), a website, a mobile application, or various other types of network-accessible resources. In some embodiments, secure resource 104 may require authentication, such as through the use of a privileged credential (e.g., password, SSH key, symmetric (e.g., public/private) key, or other type of cryptographic data or privileged access token). In accordance with disclosed embodiments, however, such authentication information, if any, need not be provided by identity 102.

Blockchain network 106 is a distributed system providing for the storage of distributed ledgers across one or more entities. Blockchain network 106 may be an existing (public or private) distributed network formed from and stored by a plurality of computing devices. The network may be provided or managed by a service provider, such as BitSE™, Blocko™, Blog™, Peer Ledger™, or others, or it may be an internal or proprietary blockchain network. Blockchain network 106 may maintain a continuously-growing ledger hardened against tampering and revision and may be composed of data structure blocks that exclusively hold the data received from verification service 110 or other sources. In some embodiments, every computing device in blockchain network 106 has a copy of the ledger, thereby ensuring that each ledger is independently able to assist in performing authentication. In other embodiments, as discussed further below, only a subset of entities in blockchain network 106 may have a copy of the ledger.

The data structure of blockchain network 106 may store data on one or more identities 102 accessing the blockchain network 106. For example, a data structure may include historical interaction data, human access attributes, human/machine response to challenges, and/or requests. Additionally, as discussed below, blockchain network 106 may maintain data collected from sensors throughout an environment (e.g., IoT sensors). Historical interaction data may include:

approved requests (e.g., approved log-in requests, approved building access using an RFID tag, etc.)

rejected requests (e.g., failed log-in attempts, attempted building access using an unrecognized RFID tag, etc.)

access time frame (e.g., how many times the identity has accessed the environment in a predefined period of time)

accessed services, systems, and/or applications (e.g., what resources the identity accessed or attempted to access)

last user interaction (e.g., the last action the identity completed or attempted in the environment)

last access time (e.g., the most recent time the identity was authenticated or attempted to authenticate)

Human access attributes may include, for example:

keyboard information (e.g., an identity's typing patterns, keystroke data, or language usage)

mouse pattern (e.g., temporal and spatial patterns associated with an identity's movement of a mouse)

average typing speed (e.g., an identity's average words per minute or keystrokes per minute)

browser type (e.g., an identity's preferred internet browser)

network location (e.g., an IP address associated with one or more of an identity's computing devices)

geographic location (e.g., an identity's GPS location or coordinates)

device time zone (e.g., the time zone of an identity based on the location of one or more devices associated with the identity)

activity time (e.g., the duration of an identity's session while authenticated to a resource or the duration of one or more predefined activities, such as the duration of active Internet browsing or time spent with a document open)

top applications (e.g., the applications most often opened by the identity)

startup sequence (e.g., a sequence of applications being executed or accessed by an identity)

Data stored of machine and/or human response to challenges may include, for example:

network delay response (e.g. the amount of time a network may lag when accessing one or more resources)

application delay response (e.g., the amount of time an application may require to process and/or execute a command)

error message response (e.g., an identity's actions in response to an error message)

email arrival response (e.g., whether an entity stores, open, responds to, etc. an email upon receipt, or the average amount of time before a received email is read)

open ports response command response shutdown response restart response

Request data may include, for example:

login request data (e.g., how many times an identity attempted to access a system, whether the log-in attempt was successful, the device from which the request was made, etc.)

open request connection request service request voice request application request The data structure stored by blockchain network 106 may include any combination of the above described data or other data collected by one or more blockchain participants.

Blockchain network 106 may be hosted through the Internet, a local area network (LAN), a wireless local area network (WLAN), a wide area network (WAN), a cellular communication network, or any Internet Protocol (IP) based communication network and the like. In some embodiments, blockchain network 106 may be based on public cloud infrastructure, private cloud infrastructure, hybrid public/private cloud infrastructure, or no cloud infrastructure. In such differing embodiments, identity 102, secure resource 104, and verification service 110 may each be in the same, or in different, networks or network segments.

Identity authentication entries 108 are stored records associated with an identity that contain, or allow one to compute, a credibility score associated with that identity. Credibility scores refer to data indicating the amount of credibility an identity has accrued or earned, as discussed further below. Identity authentication entries 108 may be stored in blockchain network 106 (e.g., in one or more distributed ledgers belonging to blockchain network 106). In some embodiments, each operation an identity (e.g., identity 102) makes on a device or in a network affects their credibility score. As discussed further below, system operators may configure the level of credibility, and the number of blockchain entities that must corroborate that credibility, before identity 102 is authenticated and able to access secure resource 104.

Numerous different types of data may be stored in the shared ledger in blockchain network 106. In some embodiments, these data are reported to blockchain network 106 in a secure way. For example, the applications or servers providing such data may be pre-authenticated to blockchain network 106.

As an example, in an office environment, the ledger maintained by multiple entities in blockchain network 106 may store data regarding various credibility-building actions of identities, including:

Physical building access (e.g., through radio frequency identification (RFID) or other near-field communication techniques, biometric recognition, facial recognition, voice-based recognition, punch-card or punch-clock access, etc.)

Workplace location (e.g., office location, office floor, office department, IP address, MAC address, etc.)

Electronic communications activity (e.g., email, instant messaging, videoconferencing, document sharing, etc.)

Applications stored or executable on a machine of the identity (e.g., based on a network scan of machines on the network)

Data stored on a machine of the identity (e.g., based on a network scan of machines on the network)

Resources accessed (e.g., software development in a coding environment, IT work in an administrator environment, financial analysis in a finance environment, marketing work in a marketing environment, etc.)

Attendance at meetings (e.g., project meetings, training meetings, educational meetings, division meetings, etc.)

Further, in a school environment, the ledger maintained in blockchain network 106 may store data regarding credibility-building actions of identities, including:

Attendance information (e.g., based on building entry techniques, manually entered attendance reports, etc.)

Authentication for purposes of taking tests

Transactions at a library (e.g., books loaned, on loan, returned, etc.)

Transaction at a cafeteria (e.g., items purchased, returned, etc.)

As another example, in an online banking embodiment, the ledger maintained in blockchain network 106 may store data regarding credibility-building actions of identities, including:

Time of log-in and log-off

Accounts viewed

Transactions requested (e.g., transfer, deposit, bill pay, etc.)

Updates to personal information

Additions of new accounts

Additions of new account features

Further, as an additional example, in a social media environment, the ledger maintained in blockchain network 106 may store data regarding credibility-building actions of identities, including:

Time of sign-in and sign-out

Media posted (e.g., text, photos, videos, etc.)

Media consumed (e.g., text, photos, videos, web pages, etc.)

Updates to user profile

Updates to social media preferences

In another example, in a hospital environment, the ledger maintained in blockchain network 106 may store data regarding credibility-building actions of identities, including:

Shift sign in and sign out

Hospital unit assignments

Medical certifications and credentials

Hospital requests for patients (e.g., requests for consultations, transfers, diagnostic procedures, etc.)

Access to restricted areas

In this example, the blockchain network 106 may also store data regarding credibility-building actions of patients, including:

Signing into and out of a hospital building

Entering a parking lot

Hospital ID bracelet being scanned by a doctor or nurse during rounds

Purchasing prescribed medication at a pharmacy

In some embodiments, a determination is made of what information to store in the shared ledger, what information (if any) to store remotely, and what information (if any) to delete. Due to storage constraints, for example, it may be desirable to limit the amount of storage required in the common ledger. One technique, for example, may be to store only the most recent (e.g., last 100 days, most recent 100 credibility-building actions, etc.) data. Another technique may be to generate data descriptive of credibility-building actions and store that data rather than the actual credibility-building actions themselves. For example, descriptive data may include averages of credibility-building actions, sum totals of credibility-building actions, sum totals of credibility-building actions over predefined time periods, etc. Similarly, a determination may be made to store credibility-building action data in a storage resource remote from the ledger if storage space becomes a constraint. In such embodiments, for example, verification service 110 or blockchain network 106 may determine what data to store locally in the ledger and what data to store remotely at the storage resource. Using such techniques, the most recent data, or the most probative data for computing a credibility score, may be stored locally on the ledger and older or less probative data may be stored remotely, e.g., in a cloud-based storage system or external database. In some embodiments, data stored remotely may be accessible for business analytics.

Verification service 110 may be software (e.g., a standalone application, an integrated agent, etc.), that communicates with identity 102 and a blockchain-based or other distributed network (e.g., blockchain network 106). In some embodiments, verification service 110 is installed on devices (e.g., a machine running identity 102) or resources connected to blockchain network 106. Verification service 110 may be part of a service stored on the computing devices participating in blockchain network 106. In some embodiments, verification service 110 executes transparently to identity 102 or an operating system of identity 102. As discussed further below, verification service 110 may be configured to receive requests from identity 102 for access to secure resource 104. In such embodiments, the requests may be addressed to verification service 110 or, alternatively, verification service 110 may be configured to intercept such requests (e.g., intercept them from an application running on the same machine as identity 102, or from an operating system of the machine). Further, verification service 110 can either automatically or manually receive requests from identity 102 for access to secure resource 104. For example, if an application is seeking to access secure resource 104, the process may be automatic, whereas if a user is seeking to access secure resource 104, the request may be manually sent by the user.

In some embodiments, verification service 110 is installed on multiple entities in blockchain network 106. For example, if an enterprise has a blockchain network 106 that it is operating, each participating entity in the network may have a verification service 110. Further, as discussed below, in some embodiments, multiple different enterprises or organizations may seek to secure share a single blockchain network 106, such that a sufficient number of entities are participating and able to develop a consensus about authentication decisions. Regardless of the number of enterprises or organizations, verification service 110 may have access to a ledger, an identity contract 108, or both. For example, the ledger and identity contract 108 may be stored on the same device as verification service, or stored separately in blockchain network 106.

Figure 2:
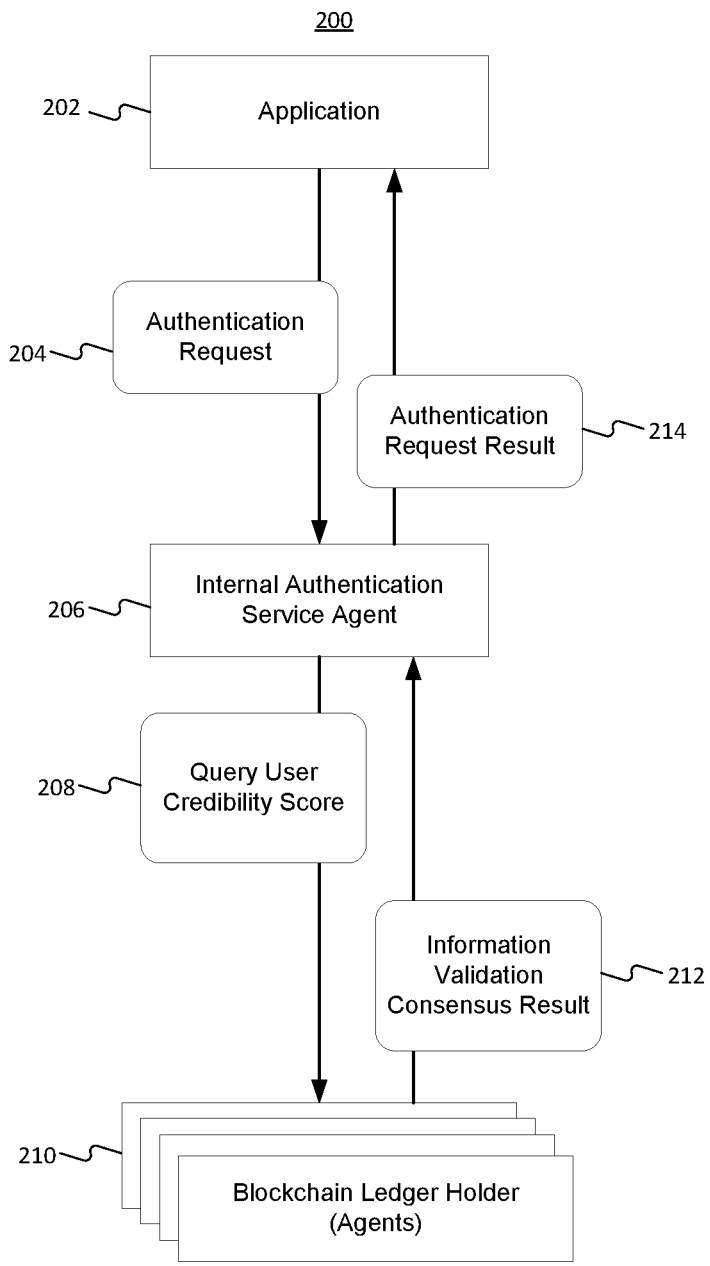
FIG. 2 is a block diagram depicting an example process for providing authentication in an example system in accordance with disclosed embodiments.

FIG. 2 is an illustration of a process 200 for authenticating a user in an embodiment of the passwordless authentication system (e.g., system 100). Process 200 may be invoked manually (e.g., by a user) or automatically (e.g., by an application). In some embodiments, a user (e.g., associated with identity 102) may attempt to log in to a secure resource (e.g., secure resource 104) via an application 202. The application 202 receives the log in request from the user and sends an authentication request 204 to internal authentication service agent 206, which may be an example of verification service 110 that is integrated into a device running identity 102. Application 202 may be any software seeking access to a secure resource. In accordance with disclosed embodiments, authentication request 204 includes no authentication credentials associated with the user.

According to process 200, internal authentication agent 206 may further receive authentication request 204, indicating that an identity is initiating a procedure to access a secure resource. Based on the authentication request 204, internal authentication agent 206 may communicate a query 208 to retrieve the user credibility score from the blockchain ledger holders 210. The blockchain ledger holders 210 may each have a copy of the ledger stored on the blockchain network (e.g., blockchain network 106) that contains data including credibility-building information and user credibility authentication entries 108, as discussed above.

In some embodiments, internal authentication service agent 206 calculates the credibility score of the identity seeking access to the secure resource. In further embodiments, the credibility score is calculated by one or more of the blockchain ledger holders 210.

Various techniques may be used for calculating the credibility score. For example, based on all of the credibility-building information stored in the ledger, the number of credibility-building actions of the identity may be counted and quantified as a numerical score (e.g., 80/100, or 80%, or 0.8). In further embodiments, the different credibility-building actions may receive different weights that factor differently into the calculation. For example, in the environment of an office discussed above, data regarding an identity entering a physical building may receive a higher weight than data regarding applications stored on the identity's machine. Further, in some embodiments, the number of times a credibility-building action has occurred can affect its weight. For example, if an identity regularly enters an office building through a physical authentication process between 8:30 am and 9:00 am at least 90% of work days, that credibility-building action may be given more weight than other factors with more variability. In further embodiments, a credibility score for an identity may be weighted so that certain time periods of credibility-building actions (e.g., more recent or less recent) may be given more weight. Thus, if an identity is determined to have a new working pattern (e.g., a new project), the credibility-building action of communicating with a new team may be given more weight than a previous credibility-building action (e.g., communicating with a prior team). In additional embodiments, additional weight may be given in a credibility score if an identity has a significant number of different types of credibility-building actions. For example, while having a single credibility-building action can result in a first weight, a second (higher) weight can be applied in the identity has four different credibility-building actions reflected in the ledger.

In addition to calculating credibility scores, the environment may also calculate the credibility score threshold required to access the environment. In other embodiments, the credibility score threshold may be calculated and/or set by a system administrator. In further embodiments, the different credibility score threshold may receive different weights corresponding to different parameters that factor differently into the calculation. For example, an identity attempting to access a database storing personally identifiable information may be required to meet a higher credibility score threshold than if that identity were attempting to access an email server from a local network. Thus, the sensitivity of data stored by a resource may affect the credibility score threshold of that resource. In some embodiments, the credibility score threshold may be a configurable, static value, or may be a dynamic value that changes as a function of time. For example, the credibility score threshold may be higher for an environment with few participants compared to an environment with a large number of participants, and may change if the number of participants in the environment changes. In another example, the credibility score threshold may increase in response to a detected cybersecurity threat and may decrease after a period of time in which no cybersecurity threats or attacks were detected.

Continuing with process 200, query 208 may fetch the calculated credibility score of the identity from the blockchain ledger holders 210. The retrieved credibility score is then validated by a consensus-seeking approach involving a fixed number of the ledger holders 210. The query result may be validated by confirming the query result matches the result from executing the same query on the locally stored ledger of each entity in blockchain network 106. In some embodiments, a predefined number or percentage of ledger holders 210 must provide the identical credibility score in order to achieve consensus. In other embodiments, the credibility scores need not be identical but must fall within a predefined tolerance (e.g., 1% or 5%). The query result may also be validated using other methods for example, by the practical byzantine fault tolerance algorithm (PBFT) or Proof-of-Stake (POS). The validation of the query results may be executed locally on each participating entity (e.g., by a locally-stored agent on each entity).

After the credibility score of the identity is validated by consensus in blockchain network 106, the information validation consensus result 212 is sent to the internal authentication service agent 206, which may then decide whether the level of consensus is sufficient to authenticate the identity, using the approaches discussed above. If the identity's credibility score was validated by consensus by blockchain network 106, internal authentication service agent 206 may send an authentication request result 214 to the application, allowing the identity to access the secure device. This may involve opening a secure communications channel between the identity and the secure device, using a proxy resource (e.g., intermediary application or server) to log the identity in to the secure device, or other techniques of secure access.

On the other hand, if the identity's credibility score was not validated, the authentication request result 214 will communicate with the application 202 such that the identity is denied access to the secure resource. In some embodiments, the identity's credibility score may be validated, but may be too low to access the secure device and the authentication request will be denied.

Figure 3:
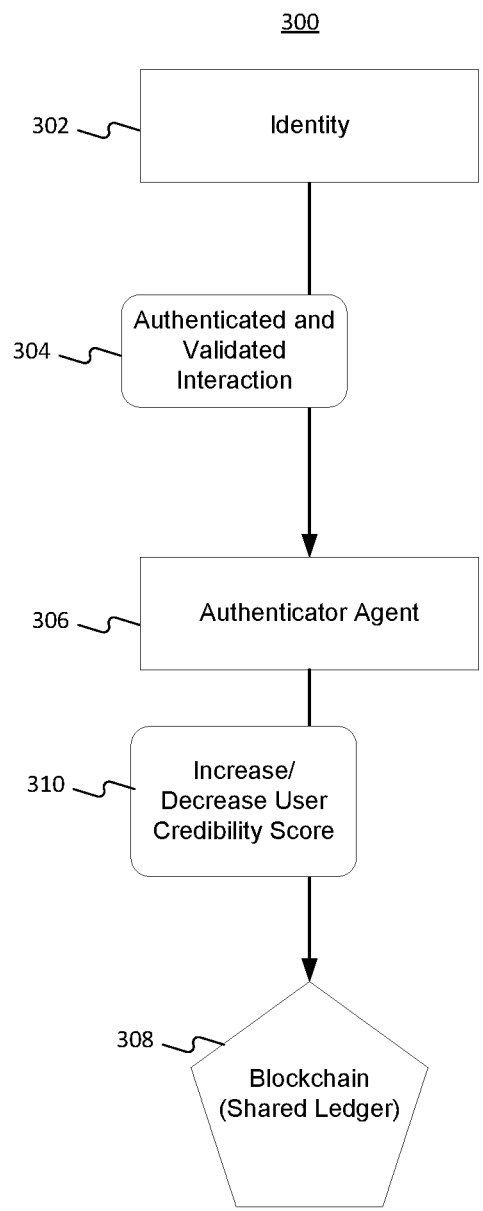
FIG. 3 is a block diagram depicting an example process for building user credibility in an example system in accordance with disclosed embodiments.

FIG. 3 depicts an exemplary process 300 through which an identity 302 may build or lose credibility, with a consequence of increasing or decreasing their credibility score. In some embodiments, identity 302 (e.g., similar to identity 102 described in connection with FIG. 1) may interact with a device in a network. The network may include, for example, devices that authenticate themselves or a corresponding identity using RFID or other NFC techniques, such as a sensor at a building entrance. For example, when a user scans their security badge or fob containing an RFID or NFC chip at the sensor, the user, via the RFID or NFC chip, may be authenticated and the entrance to the building allowed or acknowledged. The action of being authenticated by the building sensor, which is part of the network, may increase the user's credibility score, in accordance with the various credibility score computation techniques discussed above.

In some embodiments, the credibility score required to access the secure resource may be adjustable in accordance with system policies. For example, if the secure resource is a highly sensitive software development server, a higher credibility score may be required than for access to an organization's informational intranet site. The required security score may be set, for example, by the authentication agent or the secure resource. In certain embodiments, the entity controlling the secure resource may also configure what devices are part of the network and what types of interactions with these devices increase a user's credibility score.

When identity 302 is successfully authenticated by a device and/or system in the network, the authenticated and validated interaction 304 and associated data may be sent to an authenticator agent 306. Authenticator agent 306 may receive the data indicative of the user's authentication and communicate with blockchain ledger 308 to increase or decrease the user's credibility score 310 (e.g., as stated in, or derivable from, a user's credibility contract). Blockchain ledger 308 may be a part of blockchain network 106 discussed above, with a copy of the ledger 308 being stored on each computing device participating in the network 106. In some embodiments, an unauthenticated attempt to access a secure resource may decrease a user's credibility score. Further, in accordance with the above techniques of computing a credibility score, certain actions may lead to a lower score (e.g., taking an affirmative action determined to be negative, such as breaching a network security policy, attempting to access a network resource for which the user lacks permissions, copying or deleting system files, etc.).

In an exemplary embodiment of a passwordless authentication system, e.g., system 100, an employee may authenticate to one or more secure networks and/or databases from his personal computer in an office setting. When the employee brings his personal computer to the office, the employer may require that the employee's identity be authenticated before the employee can access company resources. An employee may wish to access a proprietary database from his personal computer while working in the office. The employee may initiate an application or open a folder accessing the database and an authentication request is sent from the application requesting authentication to an internal service agent managed by the employer. The employee's credibility score, stored in the employee's identity contract, is retrieved from the employer's blockchain ledger holder. Upon retrieval, the computing devices participating in the blockchain network validate the employee's identity contract by consensus. Once the identity contract is validated, the employee's credibility score may be measured against a threshold set by the employer. If the employee's credibility score meets the employer's requirements, the internal authentication service agent sends confirmation of the authentication to the employee's personal computer, allowing him to access one or more secure resources without logging into the employer's network with a password and username.

In some embodiments, consensus between the blockchain participants may be reached using one or more techniques of voting. In other embodiments, consensus may be configured to give more weight to some participants and less weight to others. For example, a system may include veto certain participants, prioritize premium participants, and differently assess lower-grade, or standard, participants. A veto participant may be a trusted participant able to veto consensus. An exemplary trusted participant may be a secure device. A premium participant may be given a higher weight in the consensus algorithm to protect from consensus hijacking by attackers. A premium participant may be configured, or predefined, as a premium participant or may accrue premium status by building credibility as previously described. In other embodiments, a participant's weight in the consensus algorithm may vary over time. For example, a lower-graded participant's weight in the consensus algorithm may increase as the lower-grade participant's credibility score increases, thus preventing a newly joined participant without proven credibility from influencing consensus.

In this example, the employer may identify a certain credibility score required by an employee. The employee's identity contract must contain at least the certain credibility score to be verified by the employer's authentication agent. The employer may additionally determine what actions taken by the employee increase the employee's credibility score and by what amount. For example, accessing an office building or area of an office building authenticated RFID badge may increase an employee's credibility score. Other actions, such as electronic communication activity, may also increase credibility score, but may be weighted less than authentication associated with an employee's presence at a physical location. When the employee completes a validated interaction, the authenticator agent communicates with the employer's shared ledger to update and store the employee's new credibility score.

In another example, the passwordless authentication system may be used to authenticate a student to take a test at university. In this example the student may be required to authenticate to the university network to access the exam or to document attendance. For example, a student may open an exam portal to take an exam on their computing device. The exam portal application communicates with the internal service authentication agent of the university to retrieve the student's credibility score from the university's ledger. If the student is validated, both by consensus of the ledger and sufficient credibility score, the internal authentication service agent communicates with the exam portal application to allow the student to access the exam.

The student may build his credibility score, for example, by scanning a student identification card at the beginning of each class, by purchasing supplies at the university bookstore, or by electronically turning in homework assignments. Each student at the university may have an identity contract stored in the university's distributed ledger. The university may set up the required credibility scores such that each of the offered courses has a different threshold for authentication. As an example, a student must have authenticated at the appropriate classroom at each class meeting to be authenticated to access the final exam. The required credibility score and associated interactions to increase/decrease the credibility score may be customized by school officials or professors.

In yet another example, a passwordless authentication system may be used to authenticate a user to a social media account, e.g., Facebook®, Twitter®, Instagram®, LinkedIn®, etc. When logging in to a social media account a user is normally prompted to enter a username and password and/or complete other multi-factor authentication steps. Through an embodiment of the passwordless authentication system, the user may log in to a social media account without entering authentication information or credentials. For example, when the user opens the social media application on a smart device, the application communicates with the application's internal authentication service agent. In turn, the internal authentication service agent queries the application's blockchain ledger to retrieve the user's identity contract and credibility score. If the user's credibility score meets the application's threshold credibility score, internal authentication service agent communicates with the social media application giving the user access to his account.

The user may increase his credibility score by completing authenticated interactions such as logging in to an account, posting a photo to an account, and/or navigating to sponsored content through the social media application. Certain interactions may also decrease the user's credibility score. For example, attempts to log in to an account with an incorrect password or communicating with members of the social media application outside the user's network of friends and/or followers may decrease the user's credibility score. In one example, a number of social media platforms may share a distributed ledger to allow users to authenticate themselves across platforms.

In another example, a passwordless authentication system may be used to authenticate a hospital employee, e.g., a doctor or nurse, to access HIPPA-protected patient information. In this example the employee may be required to authenticate to the hospital database and network to access patient data or submit requests for diagnostics, prescriptions, or consultations with specialists on behalf of a patient. For example, a hospital employee may open a portal at a workstation in a hospital. The workstation communicates with the internal service authentication agent of the hospital to retrieve the employee's credibility score from the hospital's ledger. If the employee is validated, both by consensus of the ledger and sufficient credibility score, the internal authentication service agent communicates with the workstation to allow the employee to access the patient's information and records. In some embodiments, for example, in hospitals or doctors' offices, certain consensus algorithms and/or credibility scores may be implemented to comply with privacy regulations, e.g. HIPPA laws.

The hospital employee may increase his credibility score, for example, by scanning a hospital identification card to gain access to restricted areas, by verifying medical credentials and/or certifications with the hospital system, by signing in or out of shift, or by executing tasks such as scanning patients' hospital ID tags during rounds. Each employee at the hospital may have an identity contract stored in the hospital's distributed ledger. The hospital may set up its authentication requirements such that different areas of the hospital have a different threshold for authentication. As an example, an employee must have current and official credentials or certifications to enter an operating room for surgery, but a lower level of credentials or certifications to access an employee break room. The required credibility score and associated interactions to increase/decrease the credibility score may be customized by hospital officials or may be mandated by local laws and regulations.

In another example, the passwordless authentication system may be used to authenticate an identity associated with one or more Internet of Things (IoT) devices, e.g., a smart car, smart home, GPS, etc. In these examples, the identity may be required to authenticate to a database and network to access spaces, such as an office building parking garage, vehicle, home, etc. For example, an employee may be driving a vehicle enabled with RFID technology to work. The employee may attempt to enter a garage to park the vehicle. Instead of validating the employee, for example, with an identification badge, the garage may read the RFID tag of the vehicle. If the vehicle is validated, both by consensus of the ledger and sufficient credibility score, the internal authentication service agent may communicate with parking garage to allow the employee to enter.

A vehicle may increase its credibility score, for example, by entering and exiting a garage at times corresponding to when its driver signed into and out of an office building or by being locked and unlocked by a device associated with the driver. The employer may set up the required credibility scores to enter a garage. In some examples, a third-party management company may operate the garage and may require an employee to authenticate with the employer's network before entering the garage.

In some embodiments, such as the example above in which a third-party entity may require an identity to authenticate with a blockchain network, a third-party may have access to an external endpoint API of another entity's blockchain network. To authenticate an identity, the third-party may need to communicate with a primary entity's ledger to validate an identity's credentials. To maintain security, a third-party system may be enabled to access an external endpoint of the blockchain to complete an authentication of an identity.

Figure 4:
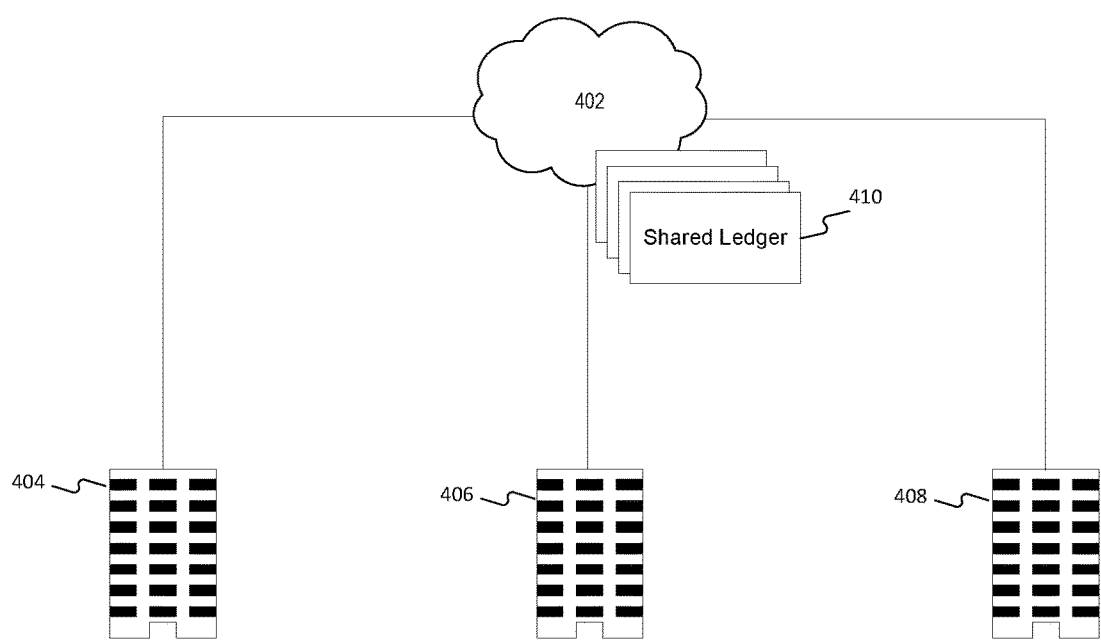
FIG. 4 is a block diagram depicting an example system in accordance with disclosed embodiments.

The above described processes 200, 300 for authenticating a user and building credibility may, in some embodiments, be employed in a cloud computing environment 402 shared by one or more entities 404, 406, 408, as shown FIG. 4. Cloud computing environment 402 may be hosted on a cloud service platform, such as those offered by, for example, Amazon®, Apple®, Cisco®, Citrix®, IBM®, Joyent®, Google®, Microsoft®, Rackspace®, Salesforce.com® and Verizon®/Terremark®, or other types of cloud services. An entity may be any organization, corporation, person, service, application, or government sharing one or more internal networks. In some instances, a single entity (e.g., entity 404) may have a small number of verification services, but not enough to determine verification of an identity by consensus. For example, if entity 404 requires at least 100 blockchain participants to authenticate an identity by consensus but only has 10 participants in its organization, it may be unable to participate in distributed authentication. Nevertheless, by collaborating with other entities (e.g., 406 and 408), entity 404 may be able to scale up the number of blockchain participants available for authentication by consensus. These entities 404, 406, 408 may each share a common ledger 410 hosted in cloud computing environment 402. In some embodiments, the entities 404, 406, 408 may each have an encrypted copy of the ledger 410, and may be restricted from accessing the verification services of the other entities. In this way, entities 404, 406, and 408 will not be able to access each other's confidential information. Such information may be maintained securely in the cloud environment 402.

As described above, in some embodiments, a single entity (e.g., entity 404) may have a small number of verification services, but not enough to determine verification of an identity by consensus. For example, if entity 404 requires at least 100 blockchain participants to authenticate an identity by consensus but only has 10 participants in its organization, it may be unable to participate in distributed authentication. In one embodiment, one or more servers belonging to the entity 404 may emulate virtual participants. This may involve, for example, creating records (e.g., contracts, ledgers, etc.) associated with such virtual participants. Alternatively, it may involve developing real or virtual machines (e.g., VMs or docker containers) to emulate blockchain participants. By emulating participants, the entity 404 may avoid possible consensus weaknesses by establishing a majority and thus preventing an attacker from injecting its own participants into the blockchain network. In some embodiments, the virtual participants may be granted veto privileges or may be defined as premium participants, as described above.

Figure 5:
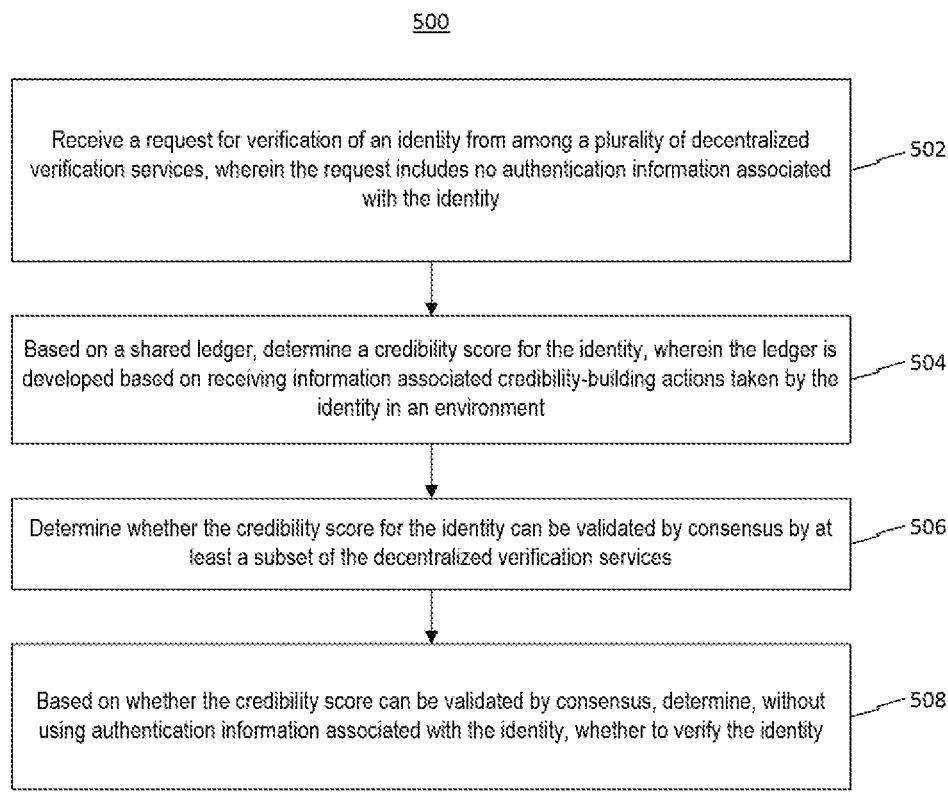
FIG. 5 is a flow diagram depicting an example process for passwordless and distributed verification in an example system in accordance with disclosed embodiments.

FIG. 5 is an exemplary process 500 for authenticating a user, e.g., identity 102 or identity 302. A first verification service, e.g., a verification service running verification service 110, internal authentication service agent 206, and/or authentication agent 306, may receive a request for verification of an identity, e.g., an identity associated with a user, from one of a plurality of distributed verification services (step 502). In some embodiments, the identity may have a contract, e.g., user credibility contract 108, with the blockchain network, e.g., blockchain network 106, that includes or can be used to calculate the credibility score for the identity. In some embodiments, the plurality of distributed verification services may be associated with a single organization, or entity. In other embodiments, as described with reference to FIG. 4, the plurality of distributed verification services may belong to more than one organization, or entity. In some embodiments, the plurality of distributed verification services are maintained in a cloud computing environment, e.g., environment 402, and each of the plurality of separate organizations are restricted from accessing distributed verification services of others of the plurality of separate organizations.

In some embodiments, the identity requests verification from the verification service, which may be verified to a blockchain network including distributed verification services. In other embodiments, the request for verification is automatically generated by an application associated with the identity. The request received by the verification service may not contain any authentication information (e.g., a password, token, key, etc.) associated with the identity. In some embodiments, the verification service may be configured to determine what information to store in the ledger and what information to store external to the ledger.

The credibility score of the identity may be determined based on a ledger maintained by the first verification service and shared by the plurality of distributed verification services, a credibility score for the identity (step 504). The ledger may be a ledger shared by computing devices participating in a blockchain network, e.g., blockchain network 106. In some embodiments, determining the credibility score for the identity includes calculating the credibility score based on the ledger maintained by the first verification service (e.g., the ledger local to the verification service). In some embodiments, determining the credibility score for the identity includes requesting that a resource external to the first verification service calculate the credibility score.

In some embodiments, the ledger is developed based on receiving information associated with a plurality of different types of credibility-building actions taken by the identity in an environment, as described previously with reference to FIG. 3. For example, credibility-building actions may include a user associated with the identity authenticating himself at a physical access point to a building, communicating electronically with other identities in the environment, creating electronic files in the environment, modifying electronic files in the environment, performing keyboard input patterns, being authenticated based on biometric information, having certain data stored on a computing device that they operate, having a certain application stored on a computing device that they operate, and/or operating a computing device associated with an IP address.

The system may determine whether the credibility score for the identity can be validated by consensus by at least a subset of the plurality of distributed verification services (step 506). In some embodiments, whether the credibility score for the identity can be validated by consensus is based on the subset of the plurality of distributed verification services determining credibility scores for the identity. In some embodiments, the determination of whether the credibility score for the identity can be validated by consensus is based on determining whether the credibility score determined by the first verification service is within a predetermined range of variance (e.g., 1%, 5%, etc.) from the credibility scores determined by the subset of the plurality of distributed verification services. Further, as discussed above, a predetermined number or percentage of verification services must participate in the consensus-seeking determination in some embodiments.

Based on whether the credibility score for the identity can be validated by consensus, the system may determine whether to verify the identity (step 508). In some embodiments, the determination of whether to verify the identity is performed without using authentication information associated with the identity. In some embodiments, determining whether to verify the identity may include determining whether to authenticate the identity. In some embodiments, the identity's credibility score may be adjusted based on the determination of whether to verify the identity.

If the identity is verified, the system may allow and/or enable the identity to communicate with an access-restricted resource, e.g., secure resource 104. As discussed above, this may involve opening a secure communication channel (e.g., tunnel, reverse tunnel, encrypted session, etc.) between the identity and the secure resource, proxying a connection between the identity and the secure resource, or other techniques.

Figure 6:
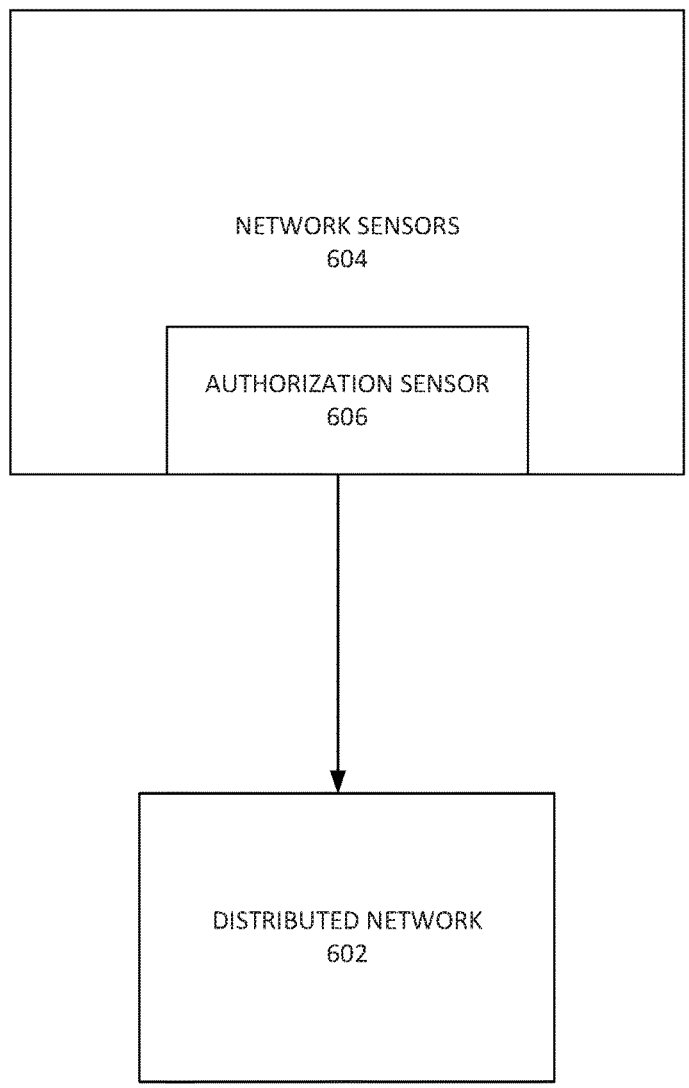
FIG. 6 is a block diagram of an example system including a network sensor and a distributed network in accordance with disclosed embodiments.

FIG. 6 is a block diagram of an exemplary system 600 for dynamically authorizing an action made by an identity in a network environment (e.g., the environments of systems 100, 200, 300, 400, as discussed above), consistent with disclosed embodiments. As previously described, with reference to FIG. 1, an identity may be verified at a device in a distributed network based on a credibility score associated with the identity. The credibility score may be increased or decreased based on certain interactions of the identity with devices in the distributed network. In some embodiments, different actions in the distributed network may require different credibility scores to authorize the identity attempting to execute the action.

In some embodiments, system 600 may be configured to manage distributed authorization and policy-related matters (e.g., operational permissions, connection permissions, access permissions, access controls, etc.) of identities (e.g., an identity 102) in a connected environment. For example, to authorize an identity to access a secure resource (e.g., a computing resource, physical location, service, purchase, etc.), the system 600 may execute a distributed decision-making process for each received authorization request. Thus, the decision to authorize the identity is not simply a deterministic, rule-based decision executed by a security service implementing configurable rule-based logic. Rather, the decision to authorize an action for a particular identity in the network may be based on a consensus of a credibility score from the multiple connected devices (e.g., sensors) 604 available in the network. In some embodiments, the credibility score may be based, in part or in whole, on interactions of an identity with one or more IoT devices operating as input sensors 604 that add onto the blockchain consensus-based solution.

System 600 may be a part of a system, e.g., system 100, for authorizing an identity to access a secure resource based on a credibility score associated with the identity. In some embodiments, as previously described with reference to FIG. 1, secure resource 104 may be any secure device, application, database, and/or network that requires an identity (e.g., identity 102) to be authorized to the resource. Secure resource 104 may be, for example, a database, a server, an IoT device, a personal computing device, a smartphone, a vehicle infotainment system, computer-embedded clothing, a building, an automated teller machine (ATM), a website, a mobile application, or various other types of network-accessible resources.

In some embodiments, a secure resource (e.g., secure resource 104) may be associated with one or more network sensors 604. Network sensors 604 may be sensors associated with one or more connected devices or secure resources and may store permissions data associated with one or more identities or accounts (e.g., user accounts, machine accounts, application IDs, IoT accounts, etc.), and with one or more running and/or deployed services, applications, connected devices, databases, or other resources and other types of identities. Accordingly, sensors 604 may take many different forms, such as software applications, light sensors, vibration sensors, biometric readers, weight sensors, heat sensors, gyroscopes, accelerometers, pattern sensors, etc. In some embodiments, network sensors 604 may be configured to operate as super nodes able to perform transactions with a distributed network 602, for example, a blockchain network, to associate the identity with identity permissions (e.g., identity contract 108). In other embodiments, network sensors 604 include one or more authorization sensors 606 that are configured to perform transactions with distributed network 602. Distributed network 602 may be implemented in a similar manner as blockchain network 106 described with reference to FIG. 1.

In some embodiments, authorization sensor 606 or network sensors 604 acting as a super node may complete a permission transaction in which the sensor or super node may dynamically modify permissions associated with an identity in the distributed network 602. The permissions transaction may include data affecting the identity's actions with devices or resources in the blockchain network, including the identity's permissions. In some embodiments, the identity transaction data is a set of rules defining the user permissions in a current state of the distributed network 602. In some embodiments, each sensor 604 may be associated with a level of trust based on the type of data received by the sensor 604. For example, a biometric scanner may have a higher level of trust than a keypad for receiving an employee number.

As an example, system 600 may be used to connect a user with a restricted service (e.g., secured computer application, computer device, physical location, service, purchase, etc.). A user or an application may be operating a client machine to connect to the service. Input may be fed to the distributed ledger from the connected devices in the network (e.g., network sensors 604) and, based on consensus between the ledger participants, the system may determine whether to authorize the connection to the restricted service, for example, from a remote desktop connection.

In another example, system 600 may dynamically alter the authorization level of one or more secure resources. For example, highly privileged or restricted services may be required to, or restricted from, running in parallel or within a predetermined period of time. System 600 may use interactions with network sensors 604 to determine whether these restricted services are running according to the authorization rules. In another such example, system 600 may prevent certain shared resources from being accessed at the same time, thereby preventing, for example, database table locking.

In yet another example, a user may walk away from his computer or mobile device. The system may determine the user is walking away from the device by, for example, receiving a scan of the user's security badge at a different location, receiving location information associated with the user, etc. System 600 may determine to lower the user's authorization permissions to his computer or mobile device. While detecting the user walking away from his computer or mobile device, system 600 may operate to modify the user's permissions in the current state of the system. For example, the system may dynamically decrease the user's permissions to access secure resources via the computer or mobile device and/or the system may lower the authorization level of the computer or mobile device or applications running on the mobile device. Thus, if another person attempted to use the user's device, that person's access would be restricted. This decreased authorization may be based on, for example, receiving a security badge scan associated with the user to a building other than the building containing the user's computer. In some embodiments, decreased authorization may comprise read-only access (e.g. read-only mail but not sending mail), printer access, and/or restricted application use.

As described above, decreased authorization may be read-only access. In some embodiments, decreased authorization may include limiting or restricting device functionality to one or more predefined services and/or applications. For example, the system may limit or control access to particular defined functionality of connected devices, and/or may limit one or more other means of control or operation. In another example, the computer or mobile device may require another layer of authentication/authorization to increase authorization and thereby allow the user to access functionality that is restricted in the decreased authorization mode. For example, the computer or device may require multi-factor authentication, system administrator approval, etc. before returning to an operational state associated with an increased level of authorization.

Similarly, in another example, a security badge or fob sensor may receive a scan from an employee entering a restricted office in which an authorized user is viewing sensitive information on a computer monitor. Based on the receipt of the security badge scan, system 600 may automatically lower the authorization level of the authorized user, such that the display of sensitive information is no longer authorized. Thus, system 600 may control authorization of the displayed content, or of the operation of the computer screen and/or computer itself based on a consensus analysis from the connected devices in network, including the badge scanner and the computer at which the two employees were authorized.

Figure 7:
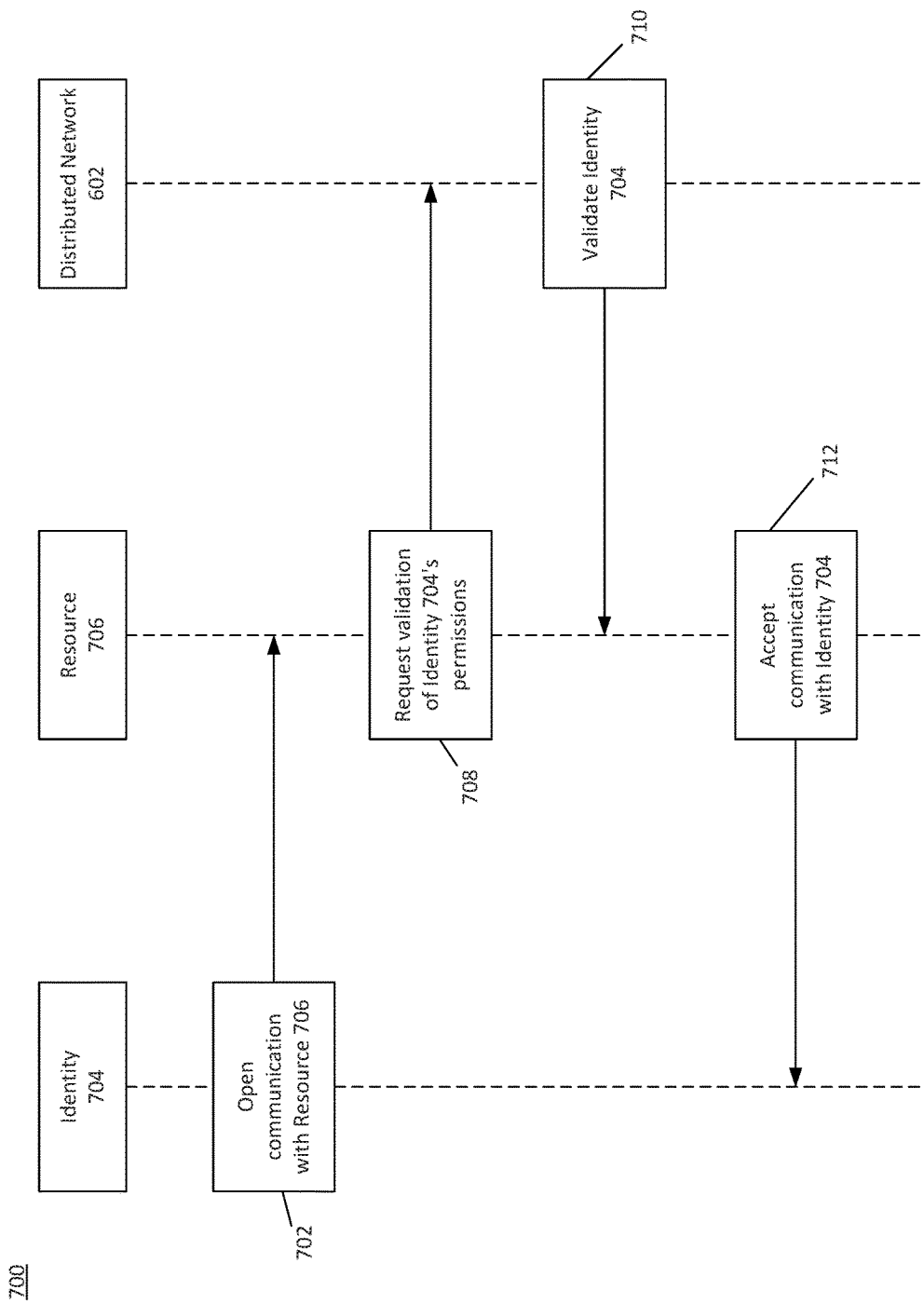
FIG. 7 is a block diagram depicting an example process for dynamically authorizing an action made by an identity in accordance with disclosed embodiments.

FIG. 7 is an exemplary process 700 for authorizing an action requested by an identity in a distributed network (e.g., distributed network 602). For example, process 700 may be executed in a blockchain network. Consistent with disclosed embodiments, process 700 may occur on demand, for instance when the identity is requesting access to a particular resource or service. At step 702, an identity 704 may open a communication session (e.g., HTTP, HTTPs, FTP, SSH, tunnel, or various other protocols) with a secure resource 706. For example, identity 704 may initiate an interaction with the secure resource 706 through interaction with an IoT device or other computing device participating in the distributed network 602.

At step 708, resource 706 may communicate with distributed network 602 to access a copy of a shared ledger and validate the permissions associated with identity 704. For example, secure resource 706 may communicate with participants in the distributed network 602 to validate identity 704 via, for example, consensus between participants in the distributed network 602. These participants may include those discussed above, as well as sensors or other connected (e.g., IoT) devices. In some embodiments, identity 704 may be validated based on process 200 described with reference to FIG. 2.

At step 710, a device participating in distributed network 602, or an internal authorization service, which may be an example of verification service 110 that is integrated into a device, may transmit permission data associated with identity 704 to secure resource 706. Permission data may include a credibility score associated with identity 704 and/or an indication that identity 704 is authorized to access secure resource 706, consistent with embodiments described above.

At step 712, based on the received permission data, secure resource 706 may accept communication with identity 704, permit access by identity 704, provide a requested service to identity 704, etc. Thus, identity 704 may be authorized, for example, via process 200 or process 900, to interact with secure resource 706 or obtain a service provided by secure resource 706.

Figure 8:
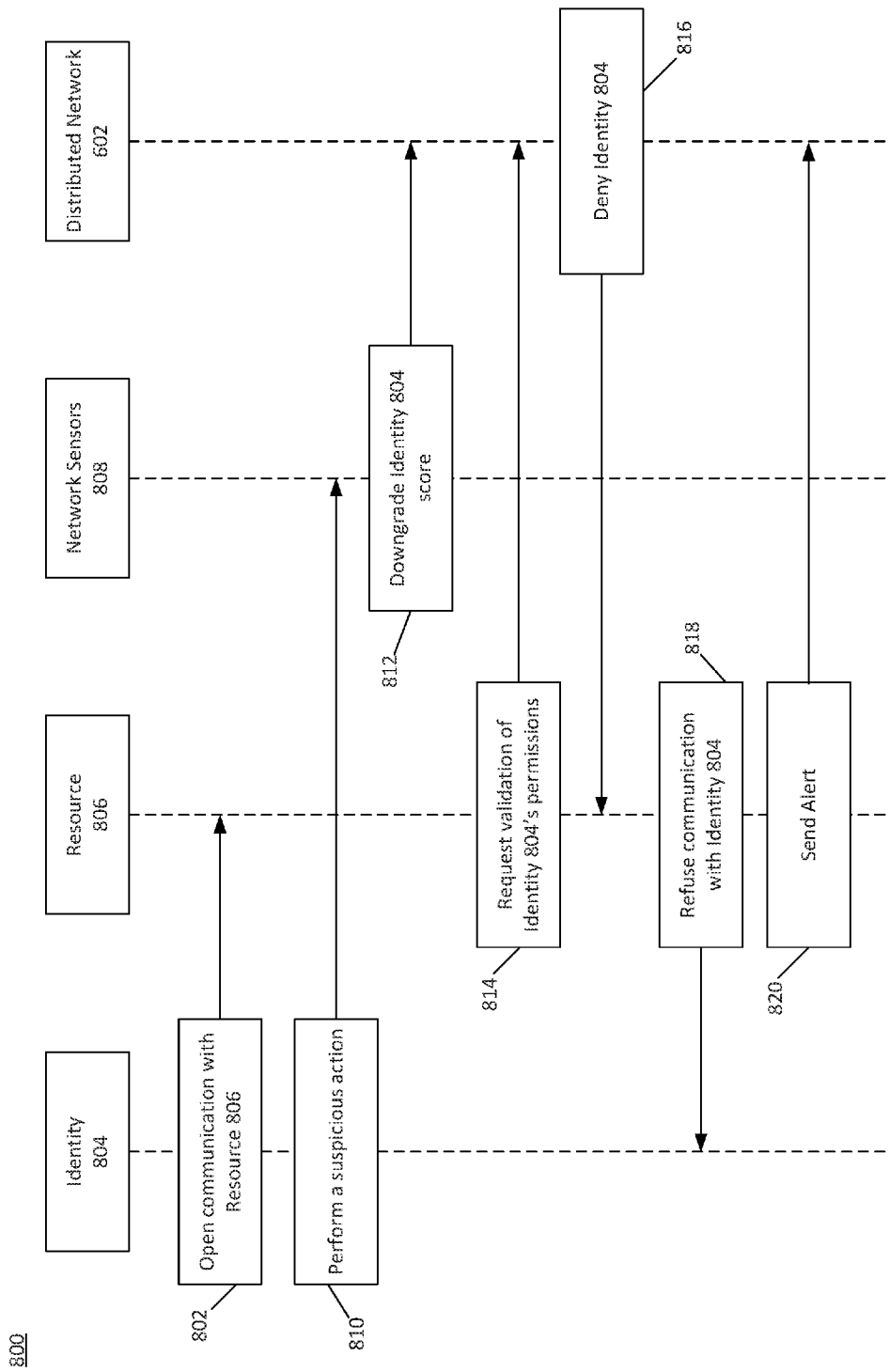
FIG. 8 is a block diagram depicting another example process for dynamically authorizing an action made by an identity in accordance with disclosed embodiments.

FIG. 8 is an exemplary process 800 for dynamically authorizing an action requested by an identity in a distributed network (e.g., distributed network 602). As with process 700, process 800 may occur substantially in real-time and on demand. At step 802, an identity 804 may open communication session with a secure resource 806, similar to the corresponding operations in process 700. Identity 804 may open the communication session, for example, by attempting to access secure resource 806, requesting a service from secure resource 806, attempting to perform an action on secure resource 806, etc.

At step 810, identity 804 may perform a suspicious or unknown action by interacting with a network sensor 808. A suspicious action may be an attempt to access another secure resource, or may be an attempt to access an unknown resource or perform an unknown action. As another example, an action may be suspicious if it occurs outside a threshold distance and/or threshold period of time from identity 804's request to open communication with resource 806.

As an example, an identity may attempt to log in to an access-restricted computing device in an office building. The computing device may be associated with a particular location, e.g., GPS coordinates or a location within the office building (e.g., floor, office number, etc.). At a later time, an RFID-enabled badge associated with the identity may be scanned on a different floor or at an entrance to the office building within a period of time (e.g., one minute, five minutes, etc.) from the log in request. The sensor validating the RFID-enabled badge may communicate with a blockchain network or internal authorization service to dynamically modify the identity's credibility score. For example, if the badge is scanned one minute after the initial log in attempt, the identity's score may be decreased based on the likelihood that a user associated with the identity could not perform both actions within the threshold period of time.

At step 812, sensor 808 may communicate with distributed network 602 to decrease the credibility score associated with identity 804. In some embodiments, identity 804's credibility score may be modified based on one or more rules based on the likelihood of each interaction received from the identity occurring within a certain time and within a certain distance.

At step 814, resource 806 may request authorization of identity 804. For example, resource 806 may communicate with distributed network 602 to authorize identity 804, e.g., using process 200 or process 900, as described below.

At step 816, based on the decreased credibility score associated with identity 804, distributed network 602 may deny access to identity 804. In some embodiments, the system may determine that the credibility score of identity 804 is below the credibility score required to access resource 806. A device of distributed network 602 may transmit identity 804's credibility score and/or an indication that identity 804 is not authorized to access resource 806 to the resource or a device associated with the resource. As a result, at step 818 resource 806 refuses communication with identity 804.

In some embodiments, at step 820, resource 806 may transmit an alert (e.g., message, visual warning, auditory alarm, etc.) indicative of a denied attempt to access a secured resource to distributed network 602 or to an internal authorization service. For example, resource 806 may transmit an alert to a device associated with a system administrator indicating a potential security threat. In some embodiments an identity may attempt to access one or more secure resources within a determined period of time, or a certain frequency or number of times. Information associated with the repeated failed attempts to access a resource may be stored by the distributed ledger and may continuously affect the credibility score for that identity. In some embodiments, the failed attempt information may result in the identity, or another trusted service or trusted source of information, being required to provide further credentials or log in information upon subsequent authorization requests.

Figure 9:
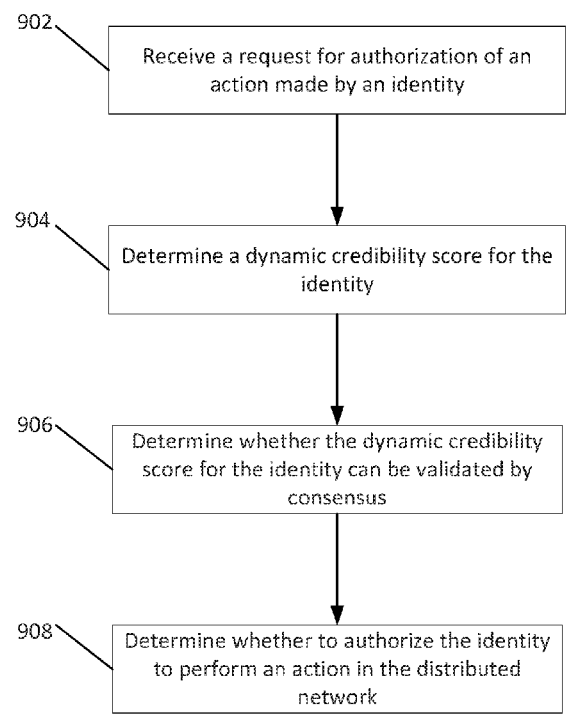
FIG. 9 is a flow diagram depicting a further example process for dynamically authorizing an action made by an identity in accordance with disclosed embodiments.

FIG. 9 is an exemplary process 900 for dynamically authorizing an action made by an identity in a dynamically connected network environment, consistent with disclosed embodiments. Process 900 may be executed by a system, e.g., system 100 or system 600.

At step 902, a sensor associated with a first verification service, e.g., a verification service running verification service 110 or an internal authorization service, may receive a request for authorization of an action made by an identity, e.g., an identity 804 associated with a user, from one of a plurality of distributed verification services. As previously described with reference to FIG. 1, the identity may have a contract, e.g., user credibility contract 108, with the distributed network, e.g., distributed network 602, that includes or can be used to calculate the credibility score for the identity. In some embodiments, the request may be associated with a request to perform an action in the distributed network. For example, an action may be any interaction with an access-restricted resource. In some embodiments, the plurality of distributed verification services are maintained in a cloud computing environment, e.g., environment 402, and each of the plurality of separate organizations are restricted from accessing distributed verification services of others of the plurality of separate organizations.

In some embodiments, the identity requests verification from the verification service (e.g., step 802 of FIG. 8), which may be verified to a distributed network including distributed verification services. In other embodiments, the request for verification is automatically generated by an application associated with the identity (e.g., step 812) when the identity interacts with one or more network sensors 604. The request received by the verification service may not contain any authentication information (e.g., a password, token, key, etc.) associated with the identity.

At step 904, the dynamic credibility score of the identity may be determined based on a ledger maintained by the first verification service and shared by the plurality of distributed verification services. The dynamic credibility score may be based in part on a level of trust of the sensor. For example, a keypad where a user must enter an employee number to purchase coffee from a coffee machine may have a lower level of trust than an RFID transceiver at the entrance of an office building. The ledger may be a ledger shared by computing devices participating in a distributed network, e.g., blockchain network 106. In some embodiments, determining the credibility score for the identity includes calculating the credibility score, as discussed above, based on the ledger maintained by the first verification service (e.g., the ledger local to the verification service associated with the sensor).

In some embodiments, the ledger is developed based on receiving information associated with a plurality of different types of credibility-building actions taken by the identity in an environment, as described previously with reference to FIG. 3 and FIG. 8. For example, credibility-building actions may include a user associated with the identity interacting with one or more network sensors. Interacting with a sensor may include, for example, the identity authenticating himself at a physical access point to a building, communicating electronically with other identities in the environment, creating electronic files in the environment, modifying electronic files in the environment, performing keyboard input patterns, being authenticated based on biometric information, having certain data stored on a computing device that they operate, having a certain application stored on a computing device that they operate, and/or operating a computing device associated with an IP address.

At step 906, the system may determine whether the credibility score for the identity can be validated by consensus by at least a subset of the plurality of distributed verification services. In some embodiments, whether the credibility score for the identity can be validated by consensus is based on the subset of the plurality of distributed verification services determining credibility scores for the identity. In some embodiments, the determination of whether the credibility score for the identity can be validated by consensus is based on determining whether the credibility score determined by the first verification service is within a predetermined range of variance (e.g., 1%, 5%, etc.) from the credibility scores determined by the subset of the plurality of distributed verification services. Further, as discussed above, a predetermined number or percentage of verification services must participate in the consensus-seeking determination in some embodiments.

At step 908, based on whether the credibility score for the identity can be validated by consensus, the system may determine whether to authorize the identity to perform the action in the distributed network. As previously described with reference to FIG. 8, each sensor in the plurality of network sensors 604 may be configured with permissions data, such that, when the identity interacts with the sensor, the sensor communicates with an associated verification service to update the identity's credibility score.

If the identity is verified, the system may allow and/or enable the identity to communicate with an access-restricted resource, e.g., secure resource 806. As discussed above, this may involve opening a secure communication channel (e.g., tunnel, reverse tunnel, encrypted session, etc.) between the identity and the secure resource, proxying a connection between the identity and the secure resource, or other techniques.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to dynamically authorize an action made by an identity in a dynamically connected networked environment, the operations comprising:
   receiving, at a first sensor associated with a first verification service, from among a plurality of distributed verification services in a distributed network, a request for authorization of the action made by the identity, wherein the request includes no authentication information associated with the identity and the request is associated with a request to perform the action in the distributed network;
   determining, based on a distributed ledger belonging to the distributed network, and maintained by a verification service and shared by the plurality of distributed verification services, a dynamic credibility score for the identity, the dynamic credibility score for the identity being based in part on a level of trust of the first sensor;
   wherein the distributed ledger is developed based on receiving information associated with a plurality of different types of credibility-building actions taken by a user associated with the identity at a plurality of sensors associated with the plurality of distributed verification services, each of the plurality of sensors being configured with permissions data;
   determining whether the dynamic credibility score for the identity can be validated by consensus by at least a subset of two or more of the plurality of distributed verification services, based on whether the dynamic credibility score for the identity is within a range of variance from one or more credibility scores for the identity determined by the subset of the plurality of distributed verification services; and
   determining, based on whether the dynamic credibility score for the identity can be validated by consensus, whether to authorize the identity to perform the action in the distributed network, wherein at least one of the credibility score determination or the validation determination is made according to a level of trust associated with the first sensor.

2. The non-transitory computer readable medium of claim 1, wherein the request includes no authentication credentials associated with the identity.

3. The non-transitory computer readable medium of claim 1, wherein each of the plurality of distributed verification services is associated with one or more of the plurality of sensors.

4. The non-transitory computer readable medium of claim 3, wherein each of the plurality of sensors is assigned a weight, wherein the weight determines an amount that one or more of the plurality of distributed verification services brings to the consensus.

5. The non-transitory computer readable medium of claim 1, wherein the level of trust is based, at least in part, on the requested action.

6. The non-transitory computer readable medium of claim 1, wherein the level of trust is based, at least in part, on an access-restricted resource associated with the verification service.

7. The non-transitory computer readable medium of claim 1, wherein the first sensor comprises at least one of: a biometric sensor or an RFID transceiver.

8. The non-transitory computer readable medium of claim 1, wherein the request for authorization is made by the identity.

9. The non-transitory computer readable medium of claim 1, wherein the first verification service is verified to the distributed network that includes the plurality of distributed verification services.

10. The non-transitory computer readable medium of claim 1, wherein authorizing the identity to perform the action in the distributed network comprises allowing the identity to access an access-restricted resource.

11. A computer-implemented method for dynamically authorizing an action made by an identity in a dynamically connected networked environment, the method comprising:
receiving, at a first sensor associated with a first verification service, from among a plurality of distributed verification services in a distributed network, a request for authorization of the action made by the identity, wherein the request includes no authentication information associated with the identity and the request is associated with a request to perform the action in the network;
determining, based on a distributed ledger belonging to the distributed network, and maintained by the first verification service and shared by the plurality of distributed verification services, a dynamic credibility score for the identity being based in part on a level of trust of the first sensor;
wherein the distributed ledger is developed based on receiving information associated with a plurality of different types of credibility-building actions taken by a user associated with the identity at a plurality of sensors associated with the plurality of distributed verification services, each of the plurality of sensors being configured with permissions data;
determining whether the dynamic credibility score for the identity can be validated by consensus by at least a subset of two or more of the plurality of distributed verification services, based on whether the dynamic credibility score for the identity is within a range of variance from one or more credibility scores for the identity determined by the subset of the plurality of distributed verification services; and
determining, based on whether the dynamic credibility score for the identity can be validated by consensus, whether to authorize the identity to perform the action in the distributed network, wherein at least one of the credibility score determination or the validation determination is made according to a level of trust associated with the first sensor.

12. The computer-implemented method of claim 11, wherein determining the dynamic credibility score for the identity includes dynamically calculating the dynamic credibility score based on the level of trust associated with the first sensor.

13. The computer-implemented method of claim 12, wherein determining whether the dynamic credibility score for the identity can be validated by consensus is based on the level of trust associated with the first sensor.

14. The computer-implemented method of claim 11, wherein the first verification service is verified to the distributed network that includes the plurality of distributed verification services.

15. The computer-implemented method of claim 14, wherein the identity has a contract with the distributed network that includes the dynamic credibility score for the identity.

16. The computer-implemented method of claim 11, wherein the first sensor comprises an RFID transceiver at a physical access point to a building.

17. The computer-implemented method of claim 11, wherein the first sensor comprises a biometric sensor of a computing device.

18. The computer-implemented method of claim 11, wherein the first sensor comprises an input interface of an IoT device.

19. The computer-implemented method of claim 11, wherein the credibility-building actions are received by a plurality of sensors, each credibility-building action being assigned a weight based on the level of trust associated with each of the plurality of sensors.

20. The computer-implemented method of claim 19, wherein authorizing the identity to perform the action in the distributed network comprises allowing the identity to access an access-restricted resource.

\* \* \* \* \*